(12) United States Patent
Takamatsu et al.

(10) Patent No.: US 11,794,621 B1
(45) Date of Patent: Oct. 24, 2023

(54) VEHICLE SEAT DEVICE AND CONTROL METHOD FOR VEHICLE SEAT DEVICE

(71) Applicants: Nissan Motor Co., Ltd., Yokohama (JP); Renault S.A.S., Boulogne-Billancourt (FR)

(72) Inventors: Atsushi Takamatsu, Kanagawa (JP); Mitsuhiro Makita, Kanagawa (JP)

(73) Assignees: Nissan Motor Co., Ltd., Yokohama (JP); Renault S.A.S., Boulogne-Billancourt (FR)

( * ) Notice: Subject to any disclaimer, the term of this patent is extended or adjusted under 35 U.S.C. 154(b) by 0 days.

(21) Appl. No.: 18/031,089

(22) PCT Filed: Oct. 12, 2020

(86) PCT No.: PCT/IB2020/000839
§ 371 (c)(1),
(2) Date: Apr. 10, 2023

(87) PCT Pub. No.: WO2022/079457
PCT Pub. Date: Apr. 21, 2022

(51) Int. Cl.
*B60N 2/888* (2018.01)
*B60N 2/879* (2018.01)

(52) U.S. Cl.
CPC ............ *B60N 2/888* (2018.02); *B60N 2/879* (2018.02)

(58) Field of Classification Search
CPC ................................ B60N 2/888; B60N 2/879
See application file for complete search history.

(56) References Cited

U.S. PATENT DOCUMENTS

| | | | |
|---|---|---|---|
| 6,158,812 A | 12/2000 | Bonke | |
| 2016/0129815 A1 | 5/2016 | Kolich et al. | |
| 2018/0134189 A1 | 5/2018 | Iwasaki et al. | |

FOREIGN PATENT DOCUMENTS

| | | |
|---|---|---|
| JP | H06-253948 A | 9/1994 |
| JP | 2015-39913 A | 3/2015 |
| JP | 2017-132364 A | 8/2017 |
| JP | 2018-79748 A | 5/2018 |
| JP | 2020-59349 A | 4/2020 |

*Primary Examiner* — Philip F Gabler
(74) *Attorney, Agent, or Firm* — Young Basile Hanlon & MacFarlane, P.C.

(57) ABSTRACT

Provided is a vehicle seat device that includes a headrest to support a head of an occupant seated on a vehicle seat. The vehicle seat device includes a rest operation adjustment mechanism provided on the headrest and to restrict or allow movement of the head of the occupant seated on the vehicle seat and a controller that controls the rest operation adjustment mechanism to allow the movement of the head of the occupant when a frequency of a vibration in a width direction of a vehicle is equal to or larger than a predetermined value.

11 Claims, 11 Drawing Sheets

VEHICLE SEAT DEVICE AND CONTROL METHOD FOR VEHICLE SEAT DEVICE

TECHNICAL FIELD

The present invention relates to a vehicle seat device and a control method for a vehicle seat device.

BACKGROUND

When a lateral (vehicle width direction) acceleration of a vehicle acts on a head of an occupant, there is a problem in that a line of sight of the occupant is unsteady and discomfort occurs.

JP 2015-39913 A discloses a support rigidity control device (vehicle seat device) in which a support rigidity in a left-right direction or a roll direction with respect to an upper body portion of an occupant seated on a vehicle seat is variable. In this device, as a high frequency component of a lateral acceleration of a vehicle increases, the support rigidity of the seat in the left-right direction or the roll direction is reduced, and a high frequency vibration component is absorbed with movement of a chest, so that the lateral acceleration of the vehicle transmitted to a head is reduced.

SUMMARY

When the occupant uses a headrest, if a high frequency vibration (quick swing) occurs in a vehicle width direction, a head may interfere with a side support of the headrest, and the quick swing of the head may be aggravated. Since the technique described in JP 2015-39913 A does not directly control a behavior of the head of the occupant, it is not possible to sufficiently reduce the aggravation of the swing due to the interference between the head and the headrest. Therefore, the discomfort of the occupant may increase due to the aggravation of the quick swing of the head.

The present invention has been made in view of the above problems, and an object of the present invention is to provide a vehicle seat device and a control method for a vehicle seat device which are capable of reducing discomfort of an occupant caused by a vibration in a vehicle width direction.

According to an aspect of this invention, there is provided a vehicle seat device that includes a headrest to support a head of an occupant seated on a vehicle seat. The vehicle seat device includes a rest operation adjustment mechanism provided on the headrest and to restrict or allow movement of the head of the occupant seated on the vehicle seat and a controller that controls the rest operation adjustment mechanism to allow the movement of the head of the occupant when a frequency of a vibration in a width direction of a vehicle is equal to or larger than a predetermined value.

DETAILED DESCRIPTION

Hereinafter, embodiments of the present invention will be described with reference to the drawings and the like.

(First Embodiment)

Figure 1:
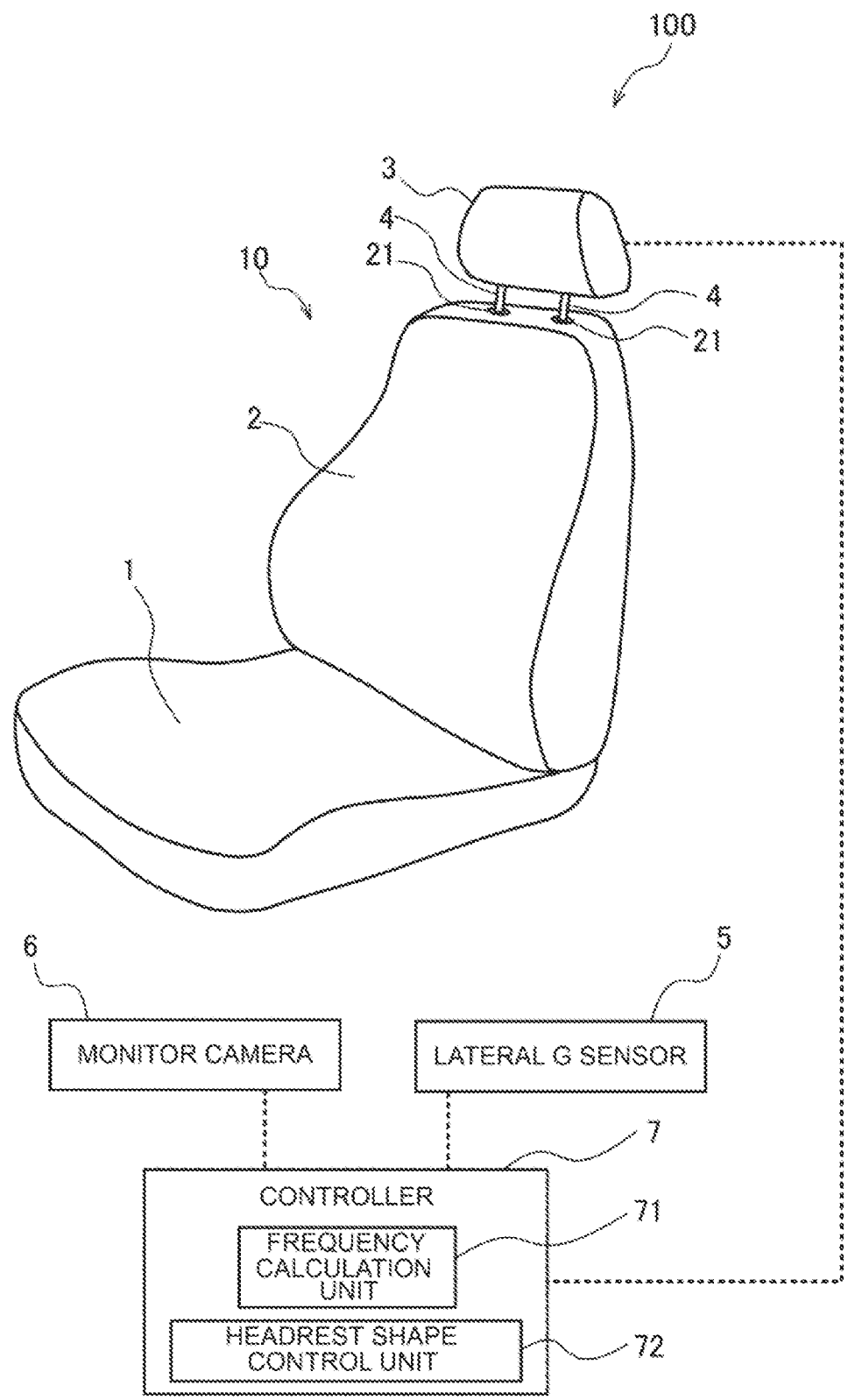
FIG. 1 is a schematic configuration diagram showing a main configuration of a vehicle seat device according to a first embodiment.

FIG. 1 is a schematic configuration diagram showing a main configuration of a vehicle seat device 100 according to a first embodiment.

The vehicle seat device 100 is a device mounted on a vehicle or the like, and includes a vehicle seat 10 including a seat cushion 1, a seatback 2, a headrest 3, headrest stays 4, and the like, a lateral G sensor 5, a monitor camera 6, and a controller 7.

The seat cushion 1 is a portion on which an occupant is seated, and is supported on a floor surface of a vehicle via a seat bracket (not shown) or the like so as to be movable in a front-rear direction of the vehicle. The occupant is not limited to a driver, and includes a person who is seated on a passenger seat, a rear seat, or the like.

The seatback 2 is a backrest that supports a back of the occupant seated on the vehicle seat 10 (seat cushion 1), and is erected from a rear end of the seat cushion 1. The seatback 2 can rise and fall with respect to the seat cushion 1 via a hinge mechanism (not shown) or the like. Stay holders 21 are provided on an upper end of the seatback 2, which have insertion holes into which the headrest stays 4 to be described later are inserted, respectively. The stay holder 21 supports the headrest stay 4 inserted into the insertion hole.

The headrest 3 is connected to the upper end of the seatback 2 via the headrest stays 4, and supports a head of the occupant seated on the vehicle seat 10 (seat cushion 1). The headrest stays 4 extend downward from the vicinities of both ends of a lower surface of the headrest 3, and are inserted into the insertion holes of the stay holders 21 provided on the seatback 2, respectively. The headrest 3 will be described in detail later.

The lateral G sensor 5 detects a lateral acceleration (lateral G) acting on the vehicle. An installation location of the lateral G sensor 5 is not particularly limited as long as the lateral G sensor 5 can detect the lateral G, and the lateral G sensor 5 is installed, for example, at a leg portion (lower portion of the seat cushion 1) of the vehicle seat 10.

Information on the lateral acceleration (lateral G) of the vehicle detected by the lateral G sensor 5 is transmitted to the controller 7.

The monitor camera 6 is an imaging device that images states of the vehicle seat 10 and the occupant seated on the vehicle seat 10. An installation location of the monitor camera 6 is not particularly limited as long as the monitor camera 6 can image the states of the occupant and the vehicle seat 10, and the monitor camera 6 is installed, for example, on a vehicle interior side of a windshield of the vehicle. A plurality of monitor cameras 6 may be installed. Information imaged by the monitor camera 6 (imaging information) is transmitted to the controller 7.

The controller 7 includes a frequency calculation unit 71 that calculates a frequency f of a vibration in a lateral direction of the vehicle, a headrest shape control unit 72 that controls a head contact area adjustment mechanism B13 (see FIG. 4) of the headrest 3 to be described later, and the like. The frequency calculation unit 71 calculates the frequency f in the lateral direction (vehicle width direction) of the vehicle based on the information on the lateral acceleration (lateral G) of the vehicle detected by the lateral G sensor 5. The headrest shape control unit 72 will be described later.

The controller 7 is implemented by a microcomputer including a central processing unit (CPU), a read-only memory (ROM), a random access memory (RAM), and an input/output interface (I/O interface). The controller 7 may be implemented by a plurality of microcomputers. The controller 7 executes a specific program to execute a process for controlling the entire vehicle seat device 100. For example, the controller 7 executes a rest operation control based on a frequency in a width direction of the vehicle to be described later.

Figure 2:
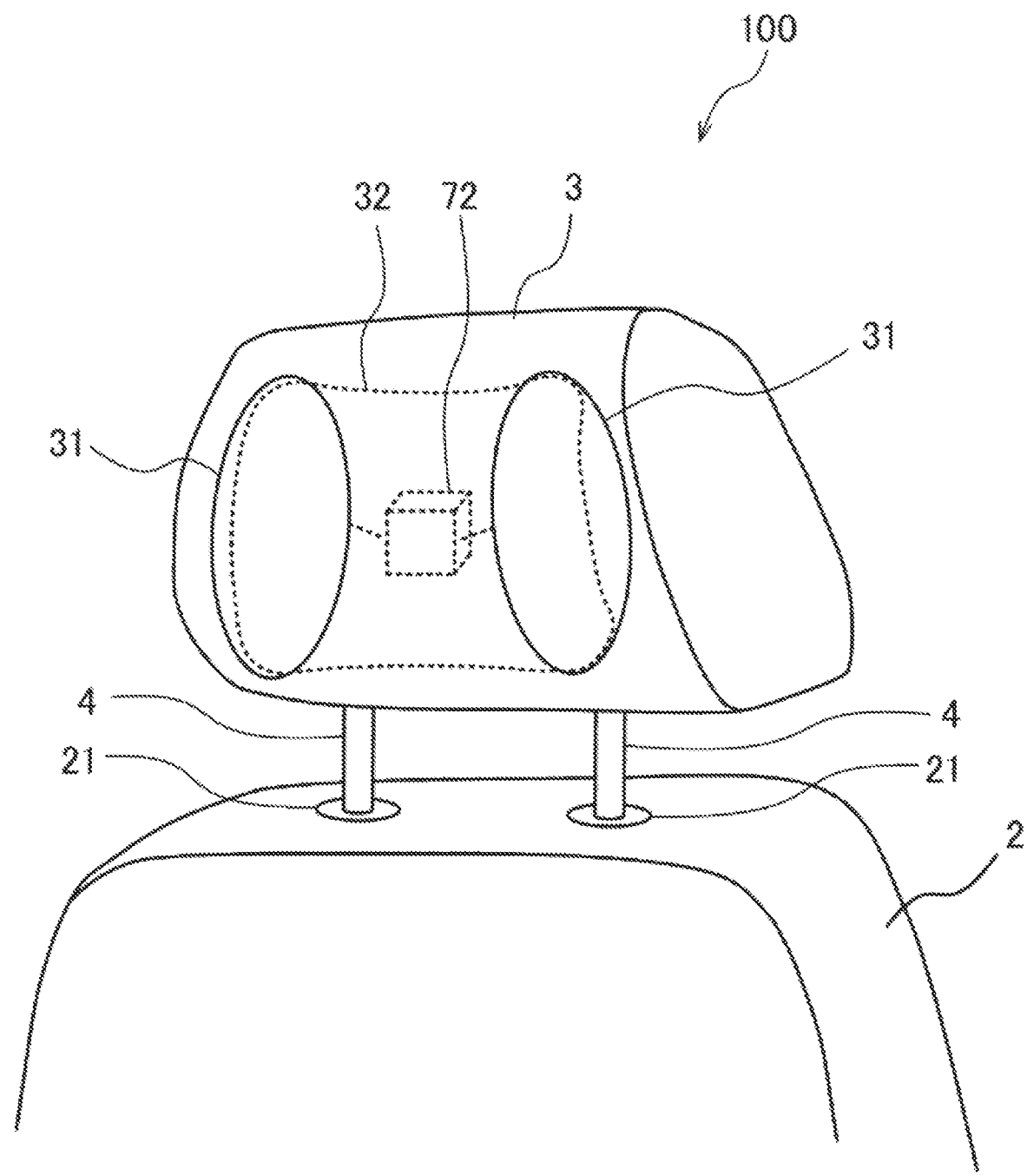
FIG. 2 is a schematic diagram showing a headrest of the vehicle seat device according to the first embodiment.

FIG. 2 is a schematic configuration diagram showing the headrest 3 of the vehicle seat device 100 according to the first embodiment.

The headrest 3 includes air chambers (rest operation adjustment mechanism, head contact area adjustment mechanism) 31, a pressure sensor 32, the headrest shape control unit 72, and the like inside the rest.

As shown in FIG. 2, the headrest stays 4 extend downward from the vicinities of both ends of the lower surface of the headrest 3, respectively. The headrest stay 4 is inserted into the insertion hole of the stay holder 21 provided on the upper end of the seatback 2. The stay holder 21 supports the headrest stay 4 inserted into the insertion hole, so that the headrest 3 is fixed to the seatback 2.

The headrest stay 4 and the stay holder 21 are provided with a lock mechanism capable of switching between a locked state in which the headrest 3 is fixed to the seatback 2 and a lock released state in which the headrest 3 can be moved up and down with respect to the seatback 2. The lock mechanism is implemented by, for example, providing an engaging spring member on the headrest stay 4 and providing a groove with which the engaging spring member engages on the stay holder 21. In this case, for example, the headrest 3 can be moved up and down by tilting the headrest 3 to release the engagement between the engaging spring member of the headrest stay 4 and the groove of the stay holder 21 and sliding the headrest stay 4. However, the lock mechanism is not limited to the above, and any known lock mechanism may be used. The headrest stay 4 and the stay holder 21 are not essential components, and for example, the headrest 3 and the seatback 2 may be integrally formed without the headrest stay 4 interposed therebetween.

The air chambers 31 are each a bag-shaped member that can hold gas (air) in a state of being accommodated therein, and are built in at both end portions of the headrest 3 in the vehicle width direction and at positions where temporal regions of the occupant seated on the vehicle seat 10 come, respectively. The air chamber 31 is connected to a gas supply source such as an inflator (not shown) provided inside or outside the headrest 3. When gas is supplied from the inflator to the air chamber 31, the air chamber 31 is expanded and protrudes toward the front of the vehicle, and when the gas in the air chamber 31 is discharged, the air chamber 31 is contracted and drawn toward the rear of the vehicle. In this way, the air chamber 31 is made expandable and contractible. The air chambers 31 support the temporal regions of the occupant seated on the vehicle seat 10 from both left and right sides in a state in which the air chamber 31 is supplied with the gas and is expanded. That is, the air chamber 31 functions as a side support of the headrest 3 in an expanded state. A supply source for supplying gas (air) to the air chamber 31 is not limited to the inflator, and any known supply source may be used. The inflator (gas supply source) and the air chamber 31 are controlled by the headrest shape control unit 72 (controller 7).

The pressure sensor 32 is a pressure sensitive sensor for detecting that the occupant is seated on the vehicle seat 10 and uses the headrest 3. The pressure sensor 32 is formed in a sheet shape, and is embedded in a surface of the headrest 3 on a front side of the vehicle. When the pressure sensor 32 detects that a predetermined pressure or more is input to the headrest 3, the pressure sensor 32 transmits a detection signal to the headrest shape control unit 72 (controller 7). The predetermined pressure is a pressure at which the use of the headrest 3 by the occupant is recognized, and the headrest shape control unit 72 (controller 7) determines that the headrest 3 is being used while receiving the detection signal from the pressure sensor 32.

The headrest shape control unit 72 (controller 7) controls the inflator and the air chamber 31 to adjust a contact area between the headrest 3 and the head of the occupant. That is, the headrest shape control unit 72 supplies the gas from the inflator (gas supply source) to the air chamber 31, and causes the air chamber 31 to expand, thereby increasing the contact area between the headrest 3 and the head of the occupant. On the other hand, by discharging the gas in the air chamber 31 and causing the air chamber 31 to contract, the contact area between the headrest 3 and the head of the occupant is made smaller than when the air chamber 31 is expanded. When the headrest shape control unit 72 receives the detection signal from the pressure sensor 32, the headrest shape control unit 72 causes the air chamber 31 to expand. Accordingly, the head of the occupant seated on the vehicle seat 10 is supported.

Figure 3A:
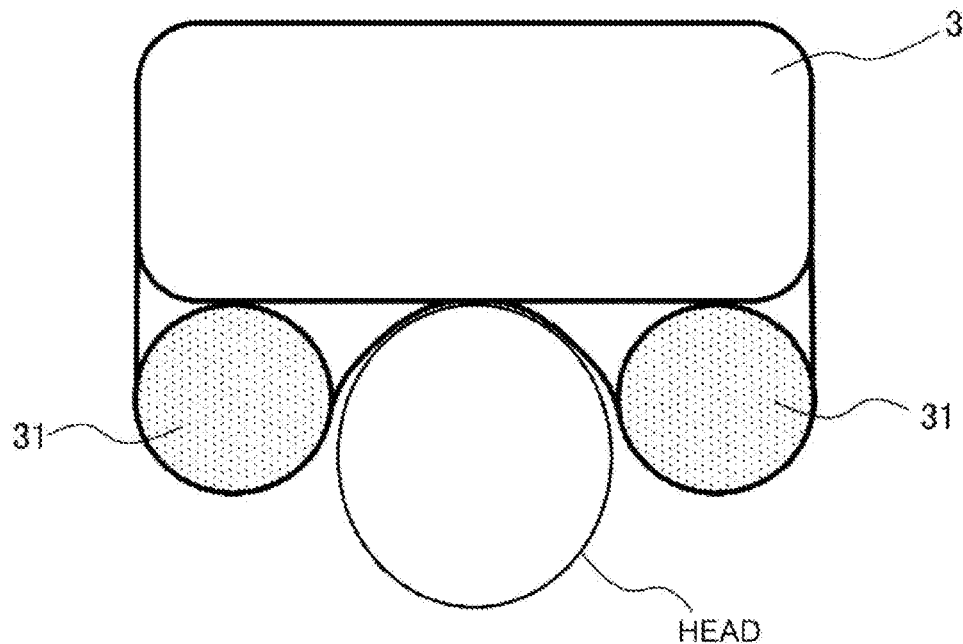
FIGS. 3A and 3B illustrate conceptual diagrams showing a contact area between the headrest and a head of an occupant when air chambers are expanded and contracted.
Figure 3B:
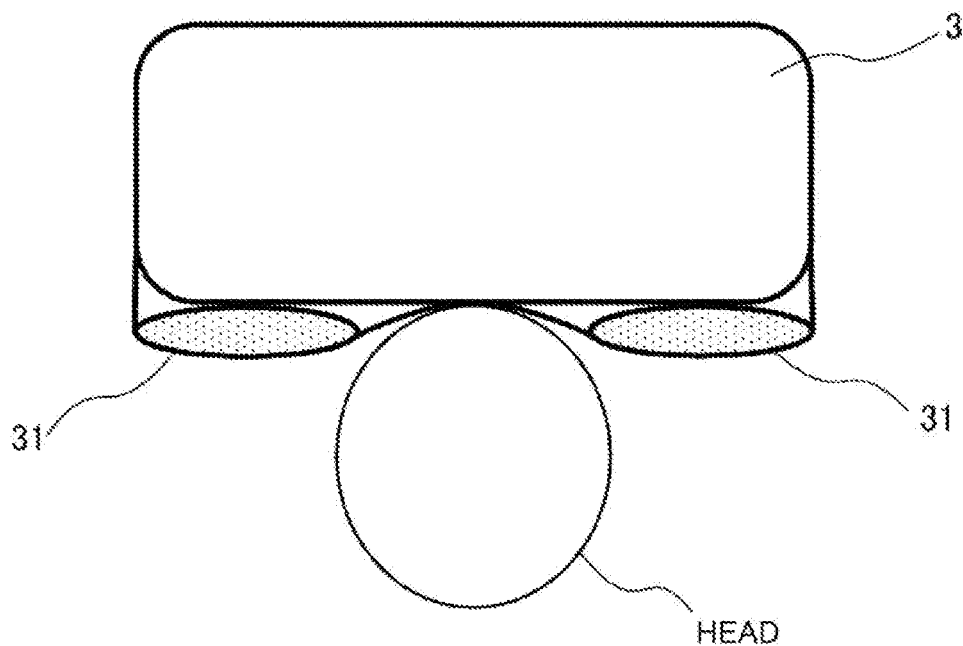

FIGS. 3A and 3B illustrate conceptual diagrams showing a contact area between the headrest 3 and the head of the occupant when the air chamber 31 is expanded and contracted, in which FIG. 3A is a diagram when the air chamber 31 is expanded, and FIG. 3B is a diagram when the air chamber 31 is contracted.

As shown in FIGS. 3A and 3B, when the air chamber 31 is expanded in FIG. 3A, the contact area between the headrest 3 and the head of the occupant is larger than when the air chamber 31 is contracted in FIG. 3B, and the temporal regions of the occupant seated on the vehicle seat 10 are supported by the headrest 3 from both left and right sides. Accordingly, movement of the head of the occupant is restricted. On the other hand, when the air chamber 31 is contracted in FIG. 3B, the contact area between the headrest 3 and the head of the occupant is smaller than when the air chamber 31 is expanded in FIG. 3A, and the movement of the head of the occupant is easily allowed. In this way, the air chamber 31 is a head contact area adjustment mechanism that adjusts the contact area between the headrest 3 and the head of the occupant, and is a rest operation adjustment mechanism that restricts or allows the movement of the head of the occupant seated on the vehicle seat 10 by adjusting the contact area between the headrest 3 and the head of the occupant.

As described above, when the use of the headrest 3 by the occupant is detected, the vehicle seat device 100 causes the air chamber 31 to expand and causes the air chamber 31 to function as the side support of the headrest 3, thereby restricting the movement of the head of the occupant in the vehicle width direction (lateral direction). When the movement of the head of the occupant is restricted in this way, even when a slow lateral swing (low frequency vibration) such as cornering or lane change occurs, phases of vibrations of the head and a torso of the occupant are synchronized with each other, and a magnitude of movement of a viewpoint of the occupant is reduced. Therefore, discomfort of the occupant is reduced, and car sickness or the like is prevented.

However, when a small lateral swing (high frequency vibration) occurs such as when traveling on an irregular road, if the movement of the head of the occupant is restricted in a state in which the small swing occurs continuously in the vehicle width direction (lateral direction), a phase difference y between the vibrations of the head and the torso of the occupant increases. That is, when the occupant uses the headrest 3, if the high frequency vibration (quick swing) occurs in the vehicle width direction, the head may interfere with the side support of the headrest 3, and the quick swing of the head may be aggravated. The aggravation of the quick swing of the head may cause the viewpoint of the occupant to become unsteady, cause the discomfort to the occupant, and cause the car sickness or the like.

Therefore, in the present embodiment, the vehicle seat device 100 is configured to allow the movement of the head of the occupant when the frequency f of the vibration in the width direction of the vehicle is equal to or larger than a predetermined value fth. If the movement of the head of the occupant is allowed, an action of spinal reflex by the cervical spine of the occupant, which attempts to synchronize movements of the torso and the head when the high frequency vibration occurs, can be activated to some extent. Accordingly, even when a small lateral swing (high frequency vibration) occurs, the phases of the vibrations of the head and the torso of the occupant are synchronized with each other, and the magnitude of the movement of the viewpoint of the occupant is reduced, so that the discomfort of the occupant is prevented.

Figure 4:
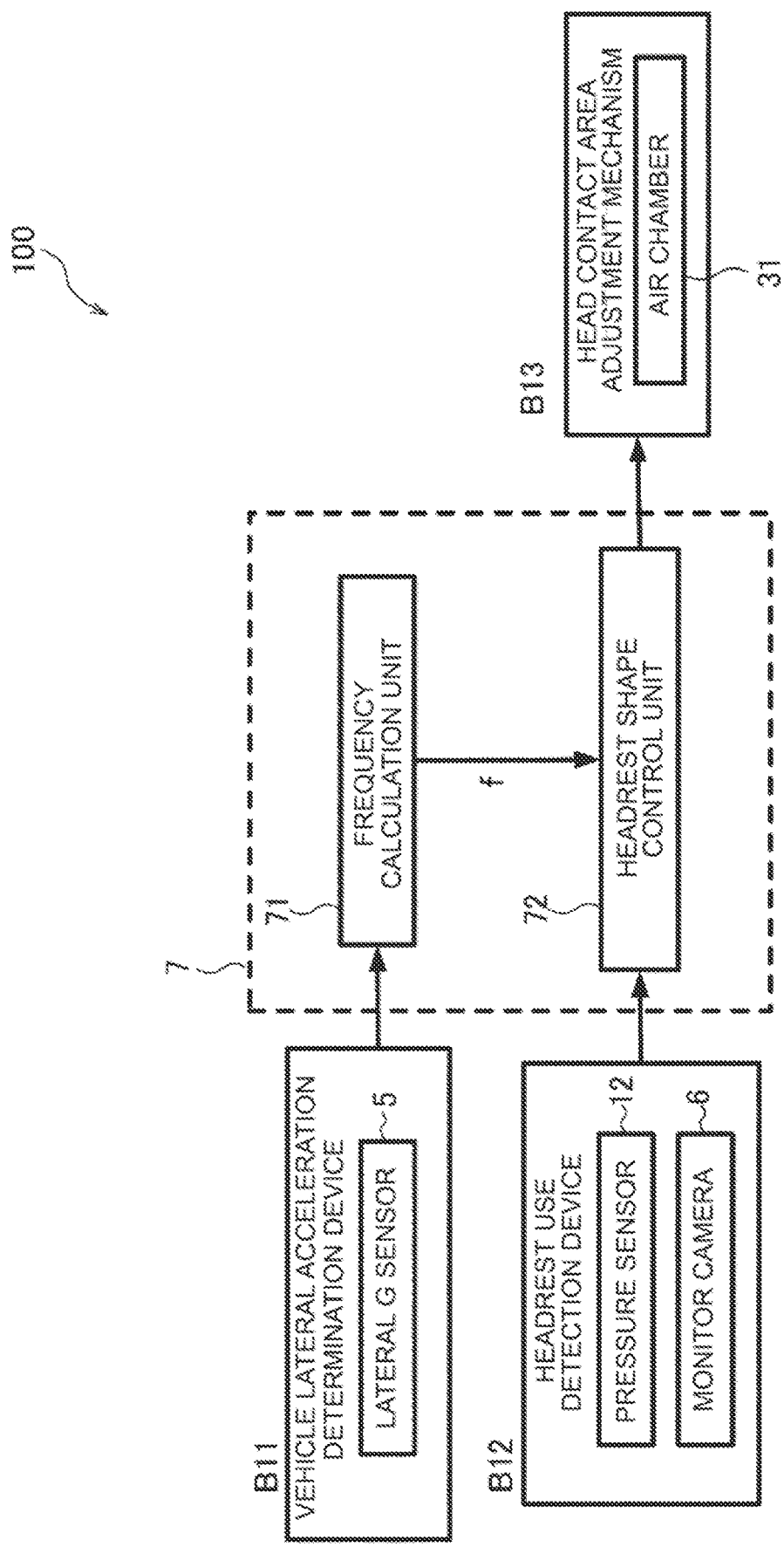
FIG. 4 is a block diagram showing a functional configuration of the vehicle seat device according to the first embodiment.

FIG. 4 is a block diagram showing a functional configuration of the vehicle seat device 100 according to the first embodiment.

As shown in FIG. 4, the controller 7 includes the frequency calculation unit 71 and the headrest shape control unit 72.

The detected lateral acceleration (lateral G) information of the vehicle is transmitted to the frequency calculation unit 71 from the lateral G sensor 5 which is a vehicle lateral acceleration measurement device B 11 for detecting the lateral acceleration of the vehicle. The frequency calculation unit 71 calculates the frequency f of the vibration in the lateral direction (vehicle width direction) of the vehicle based on the received lateral acceleration (lateral G) information. The calculated frequency f of the vibration in the vehicle width direction is input to the headrest shape control unit 72.

Headrest use determination information is transmitted to the headrest shape control unit 72 from a headrest use detection device B 12 for detecting the use of the headrest 3 by the occupant. The headrest use detection device B 12 is, for example, the pressure sensor 32 described above, and detection information of the pressure sensor 32 is transmitted to the headrest shape control unit 72 as the headrest use determination information. The frequency f of the vibration in the vehicle width direction of the vehicle calculated by the frequency calculation unit 71 is input to the headrest shape control unit 72.

The headrest use detection device B 12 is not limited to the pressure sensor 32, and may be any known device as long as the device can detect the use of the headrest 3 by the occupant. For example, the monitor camera 6 may be used. In this case, the imaging information of the monitor camera 6 is transmitted to the headrest shape control unit 72, and the headrest shape control unit 72 determines whether the headrest 3 is used by the occupant based on the imaging information.

The headrest shape control unit 72 determines, based on the headrest use determination information, whether the use of the headrest 3 by the occupant is recognized. When the use of the headrest 3 is recognized, the headrest shape control unit 72 determines whether the input frequency f of the vibration in the vehicle width direction of the vehicle is equal to or larger than the predetermined frequency $f_{th}$, and controls the head contact area adjustment mechanism (rest operation adjustment mechanism) B13 based on the determination result. Here, the predetermined frequency $f_{th}$ is a frequency at which, when the movement of the head of the occupant is restricted, the swing of the head is aggravated by the side support of the headrest 3, and a phase difference occurs between the vibrations of the head and the torso of the occupant to cause the discomfort to the occupant, and can be set in advance with an experiment or the like.

When the frequency f of the vibration in the vehicle width direction is smaller than the predetermined frequency $f_{th}$, the headrest shape control unit 72 sends a command to the head contact area adjustment mechanism (rest operation adjustment mechanism) B13 to increase the contact area between the headrest 3 and the head of the occupant. Specifically, the air chamber 31, which is the head contact area adjustment mechanism B13, is expanded. Accordingly, the air chamber 31 protrudes from the headrest 3 toward the front of the vehicle, the contact area between the headrest 3 and the head of the occupant increases, and the movement of the head of the occupant is restricted. On the other hand, when the input frequency f of the vibration in the vehicle width direction of the vehicle is equal to or larger than the predetermined frequency $f_{th}$, the headrest shape control unit 72 sends a command to the head contact area adjustment mechanism (rest operation adjustment mechanism) B13 to reduce the contact area between the headrest 3 and the head of the occupant. Specifically, the air chamber 31, which is the head contact area adjustment mechanism B13, is contracted from the expanded state. Accordingly, the contact area between the headrest 3 and the head of the occupant is reduced, and the movement of the head of the occupant is allowed. As the movement of the head is allowed, the phases of the vibrations of the head and the torso of the occupant are synchronized with each other by the action of spinal reflex of the occupant.

In this way, in the present embodiment, when the frequency f of the vibration in the width direction of the vehicle is equal to or larger than the predetermined value $f_{th}$, the contact area between the headrest 3 and the head of the occupant is reduced, so that the movement of the head of the occupant is allowed, and the phases of the vibrations of the head and the torso of the occupant are synchronized with each other. Accordingly, even when the high frequency vibration occurs in the vehicle width direction, the magnitude of the movement of the viewpoint of the occupant is reduced, and the discomfort of the occupant is prevented.

Figure 5:
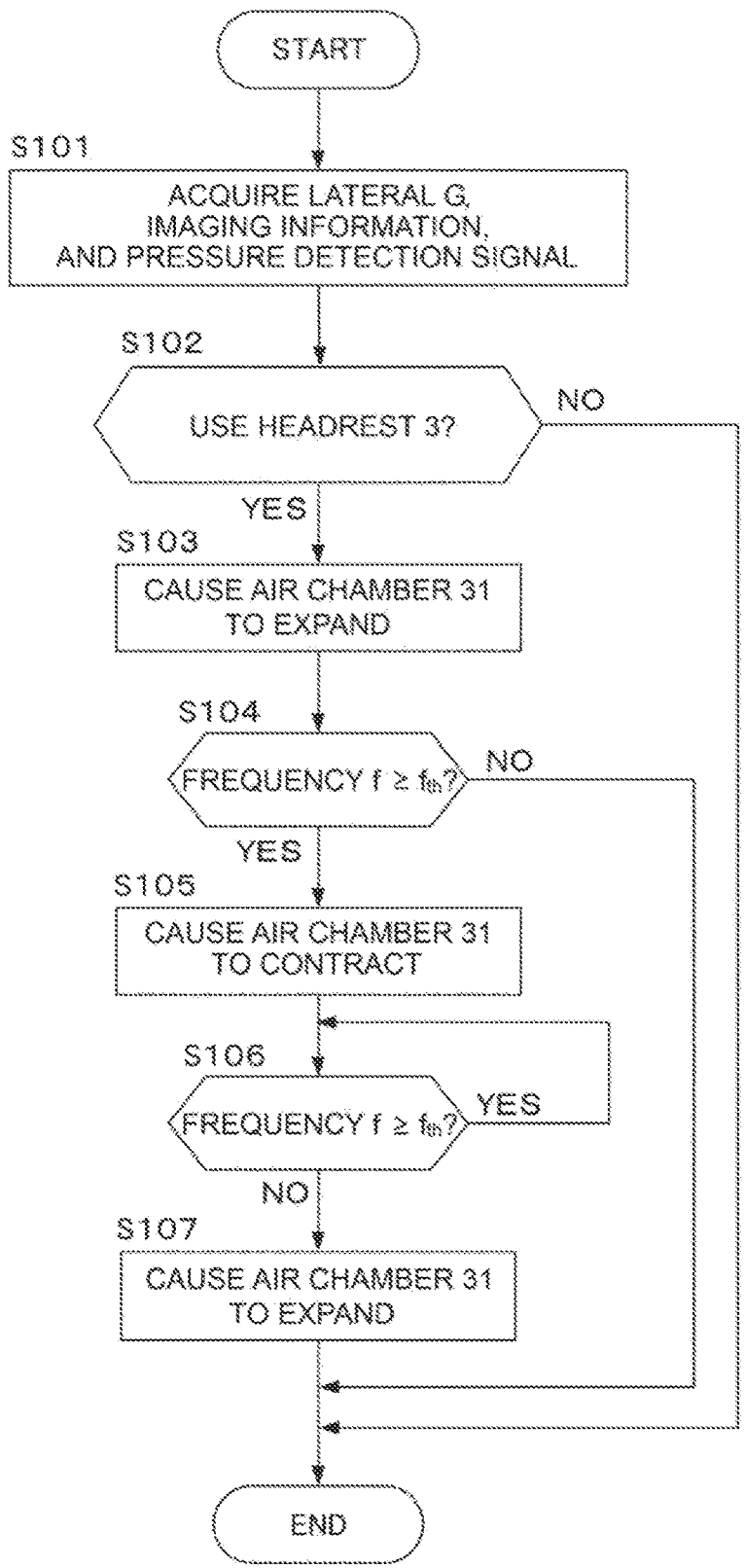
FIG. 5 is a flowchart showing a rest operation control based on a frequency in a width direction of a vehicle executed by the vehicle seat device according to the first embodiment.

FIG. 5 is a flowchart showing a rest operation control based on a frequency in the width direction of the vehicle executed by the vehicle seat device 100 according to the present embodiment. All of the following controls are repeatedly executed by the controller 7.

As shown in FIG. 5, the rest operation control based on the frequency in the width direction of the vehicle executed by the vehicle seat device 100 is started when the controller 7 receives an activation command of the vehicle seat device 100. For example, when an ON operation for switching a start key of the vehicle from OFF to ON is performed, an activation command is transmitted to the controller 7.

When the activation command is received, in step S101, the controller 7 acquires the information on the lateral acceleration (lateral G) of the vehicle detected by the lateral G sensor 5 and the imaging information captured by the monitor camera 6. When the pressure sensor 32 detects a predetermined pressure or more, the controller 7 receives a detection signal.

In step S102, the controller 7 determines whether the occupant is using the headrest 3. Whether the headrest 3 is used is determined based on whether the pressure sensor 32 detects that the predetermined pressure or more is input to the headrest 3, that is, whether the controller 7 receives the detection signal from the pressure sensor 32. When the use of the headrest 3 by the occupant is not recognized, the controller 7 ends the rest operation control based on the frequency in the width direction of the vehicle. On the other hand, when the pressure sensor 32 detects the pressure input to the headrest 3 and the use of the headrest 3 by the occupant is recognized, the controller 7 executes a process of step S103. As described above, whether the headrest 3 is used may be determined based on whether the use of the headrest 3 by the occupant is recognized, according to the imaging information captured by the monitor camera 6.

When the use of the headrest 3 is recognized, in step S103, the headrest shape control unit 72 (controller 7) causes the air chamber 31 to expand. Accordingly, the air chamber 31 protrudes toward the front of the vehicle and functions as the side support of the headrest 3, and the contact area between the headrest 3 and the head of the occupant increases. In step S103, when the air chamber 31 is already in an expanded state, the headrest shape control unit 72 (controller 7) maintains the state.

Next, in step S104, the controller 7 determines whether the frequency f of the vibration in the lateral direction (vehicle width direction) of the vehicle is equal to or larger than the predetermined frequency $f_{th}$. As described above, the frequency f of the vibration in the vehicle width direction is calculated by the frequency calculation unit 71 of the controller 7 based on the information on the lateral acceleration (lateral G) of the vehicle detected by the lateral G sensor 5. When the frequency f of the vibration in the vehicle width direction is smaller than the predetermined frequency $f_{th}$, the controller 7 ends the rest operation control based on the frequency in the width direction of the vehicle. On the other hand, when the frequency f of the vibration in the vehicle width direction is equal to or larger than the predetermined frequency $f_{th}$, the controller 7 executes a process of step S105.

In step S105, the headrest shape control unit 72 (controller 7) causes the air chamber 31 to contract toward the rear of the vehicle. Accordingly, the contact area between the headrest 3 and the head of the occupant is reduced, and the movement of the head of the occupant is allowed. As the movement of the head is allowed, the phases of the vibrations of the head and the torso of the occupant are synchronized with each other by the action of spinal reflex of the occupant. When the air chamber 31 is contracted to reduce the contact area between the headrest 3 and the head of the occupant, the controller 7 executes a process of step S106. In step S105, when the air chamber 31 is already in a contracted state, the headrest shape control unit 72 (controller 7) maintains the state.

In step S106, the headrest shape control unit 72 (controller 7) determines again whether the frequency f of the vibration in the lateral direction (vehicle width direction) of the vehicle is equal to or larger than the predetermined frequency $f_{th}$. A determination procedure is the same as in step S104. When the frequency f of the vibration in the vehicle width direction is equal to or larger than the predetermined frequency $f_{th}$, the headrest shape control unit 72 (controller 7) repeats the process of step S106 while maintaining the contracted state of the air chamber 31 until the frequency f of the vibration in the vehicle width direction is smaller than the predetermined frequency $f_{th}$. On the other hand, when the frequency f of the vibration in the vehicle width direction is smaller than the predetermined frequency $f_{th}$, the controller 7 executes a process of step S107.

In step S107, the headrest shape control unit 72 (controller 7) causes the air chamber 31 to expand to increase the contact area between the headrest 3 and the head of the occupant. When the process of step S107 is executed, the controller 7 ends the rest operation control based on the frequency in the width direction of the vehicle.

According to the vehicle seat device 100 in the first embodiment described above, the following effects can be obtained.

The vehicle seat device 100 includes the rest operation adjustment mechanism (air chamber 31) provided on the headrest 3 and configured to restrict or allow the movement of the head of the occupant seated on the vehicle seat 10, and the headrest shape control unit 72 (controller 7). The headrest shape control unit 72 (controller 7) controls the rest operation adjustment mechanism (air chamber 31) to allow the movement of the head of the occupant when the frequency f of the vibration in the width direction of the vehicle is equal to or larger than the predetermined value $f_{th}$. In this way, when the frequency f of the vibration in the width direction of the vehicle is equal to or larger than the predetermined value $f_{th}$, the movement of the head of the occupant is allowed, and the action of spinal reflex of the occupant which attempts to synchronize the movements of the torso and the head is activated. Therefore, even when the small lateral swing (high frequency vibration) occurs in the vehicle, the phases of the vibrations of the head and the torso of the occupant can be synchronized with each other, and the magnitude of the movement of the viewpoint of the occupant is reduced, so that the discomfort of the occupant is prevented. That is, it is possible to reduce the discomfort of the occupant caused by the vibration in the vehicle width direction.

According to the vehicle seat device 100, when the frequency f of the vibration in the width direction of the vehicle is equal to or larger than the predetermined value $f_{th}$, the headrest shape control unit 72 (controller 7) controls the head contact area adjustment mechanism B13 (air chamber 31) to reduce the contact area between the headrest 3 and the head of the occupant. Accordingly, when the frequency f of the vibration in the width direction of the vehicle is equal to or larger than the predetermined value $f_{th}$, the movement of the head of the occupant is allowed. Therefore, even when the small lateral swing (high frequency vibration) occurs in the vehicle, the phases of the vibrations of the head and the torso of the occupant can be synchronized with each other, and the magnitude of the movement of the viewpoint of the occupant is reduced, so that the discomfort of the occupant is prevented.

The vehicle seat device 100 includes the air chambers 31 that are built in the headrest 3 and are expandable and contractible in the front-rear direction of the vehicle at the positions where the temporal regions of the occupant seated on the vehicle seat 10 come, respectively. When the frequency f of the vibration in the width direction of the vehicle is equal to or larger than the predetermined value $f_{th}$, the headrest shape control unit 72 (controller 7) causes the air chamber 31 to expand to reduce the contact area between the headrest 3 and the head of the occupant. Accordingly, when the frequency f of the vibration in the width direction of the vehicle is equal to or larger than the predetermined value $f_{th}$, the movement of the head of the occupant is allowed. Therefore, even when the small lateral swing (high frequency vibration) occurs in the vehicle, the phases of the vibrations of the head and the torso of the occupant can be synchronized with each other, and the magnitude of the movement of the viewpoint of the occupant is reduced, so that the discomfort of the occupant is prevented.

In the present embodiment, the air chamber 31 is used as the head contact area adjustment mechanism B13 that adjusts the contact area between the headrest 3 and the head of the occupant, but the head contact area adjustment mechanism B13 is not necessarily limited to the air chamber 31 as long as the contact area between the headrest 3 and the head of the occupant can be adjusted. For example, the head contact area adjustment mechanism B13 may be actuators that are built in the headrest 3 and are expandable and contractible in the front-rear direction of the vehicle at the positions where the temporal regions of the occupant seated on the vehicle seat 10 come, respectively. In this case, when the use of the headrest 3 by the occupant is recognized, the headrest shape control unit 72 (controller 7) causes the actuators to expand toward the front of the vehicle. When the frequency f of the vibration in the width direction of the vehicle is equal to or larger than the predetermined value $f_{th}$, the headrest shape control unit 72 (controller 7) causes the actuators to contract toward the rear of the vehicle. Accordingly, when the frequency f of the vibration in the width direction of the vehicle is equal to or larger than the predetermined value $f_{th}$, the contact area between the headrest 3 and the head of the occupant is reduced, and the movement of the head of the occupant is allowed.

In the present embodiment, when the frequency f of the vibration in the width direction of the vehicle is equal to or larger than the predetermined value $f_{th}$, the movement of the head of the occupant is allowed by reducing the contact area between the headrest 3 and the head of the occupant. That is, the contact area between the headrest 3 and the head of the occupant is changed in two steps of large and small values using the predetermined value $f_{th}$ as a threshold value, but the present invention is not necessarily limited thereto. That is, a size of the contact area between the headrest 3 and the head of the occupant may be changed in multiple stages in accordance with a magnitude of the frequency f of the vibration in the vehicle width direction, or the size of the contact area between the headrest 3 and the head of the occupant may be continuously changed in accordance with the magnitude of the frequency f of the vibration in the vehicle width direction.

(Modification of First Embodiment)

A vehicle seat device 100' according to a modification of the first embodiment will be described with reference to FIGS. 6 and 7. The present modification is different from the first embodiment in that whether the frequency f of a vibration in a vehicle width direction is equal to or larger than the predetermined frequency $f_{th}$ is determined based on a phase difference φ between vibrations of a head and a torso of an occupant in the vehicle width direction. The same elements as those in the first embodiment are denoted by the same reference numerals, and the description thereof will be omitted.

Figure 6:
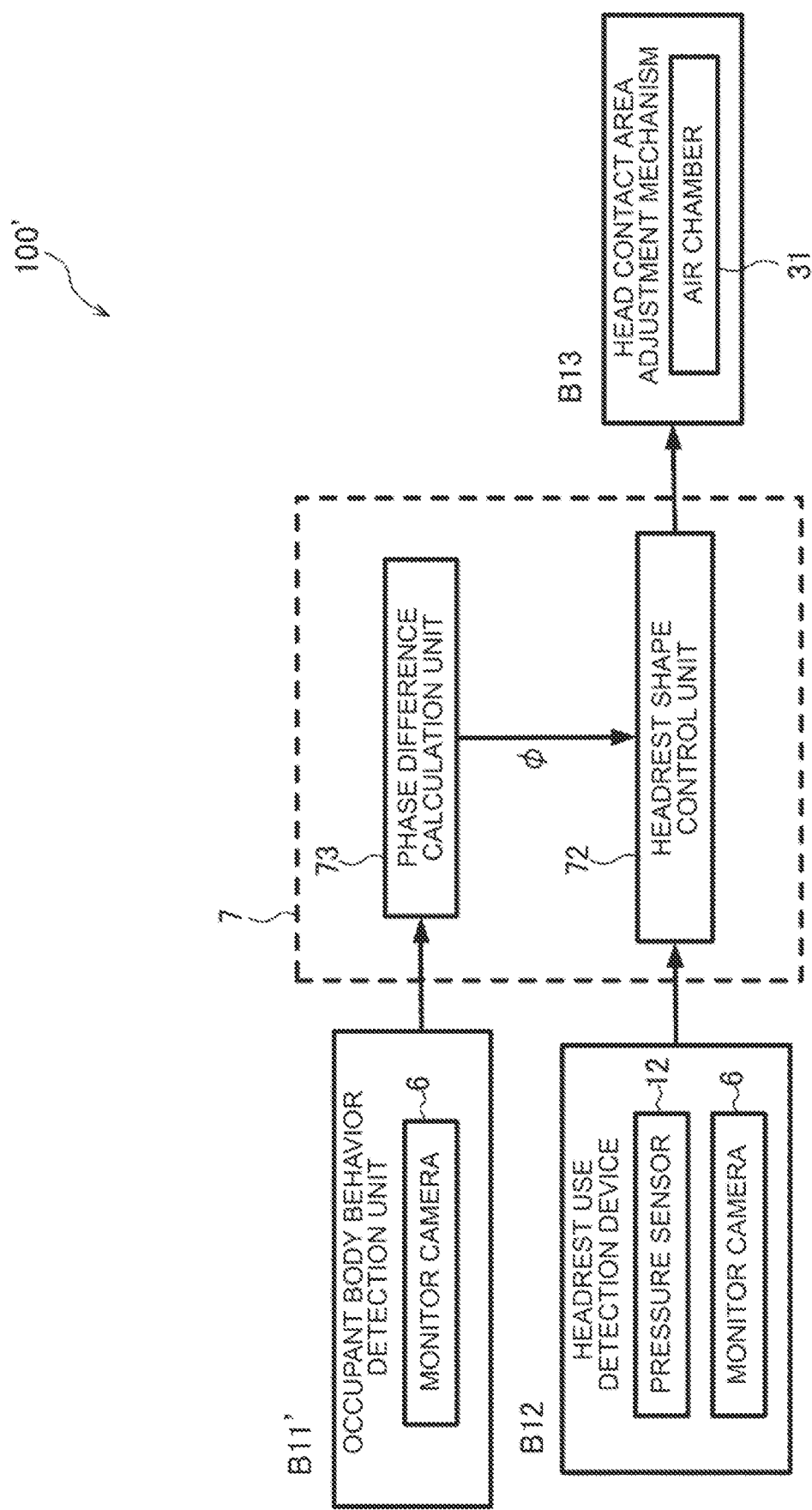
FIG. 6 is a block diagram showing a functional configuration of a vehicle seat device according to a modification of the first embodiment.

FIG. 6 is a block diagram showing a functional configuration of the vehicle seat device 100' according to the modification of the first embodiment.

As shown in FIG. 6, the controller 7 includes a phase difference calculation unit 73 and the headrest shape control unit 72.

Imaging information of the monitor camera 6 which is an occupant body behavior detection unit B 11' that detects a behavior of a body of the occupant seated on the vehicle seat 10 is transmitted to the phase difference calculation unit 73. The phase difference calculation unit 73 calculates, based on the received imaging information of the monitor camera 6, the phase difference φ between the vibration of the head of the occupant seated on the vehicle seat 10 in a width direction of a vehicle and the vibration of the torso of the occupant in the width direction of the vehicle. Information (phase difference information) on the calculated phase difference φ between the vibrations of the head and the torso of the occupant is input to the headrest shape control unit 72.

Headrest use determination information from the headrest use detection device B 12 that detects the use of the headrest 3 by the occupant, and the phase difference information from the phase difference calculation unit 73 are input to the headrest shape control unit 72.

The headrest shape control unit 72 determines, based on the headrest use determination information, whether the use of the headrest 3 by the occupant is recognized. When the use of the headrest 3 is recognized, the headrest shape control unit 72 determines, based on the phase difference information, whether the phase difference φ between the vibrations of the head and the torso of the occupant is equal to or larger than a predetermined value $φ_{th}$. Here, the predetermined value $φ_{th}$ is a phase difference between the vibrations of the head and the torso of the occupant occurring when the frequency f of the vibration in the vehicle width direction is the predetermined frequency $f_{th}$. As described above, when the occupant uses the headrest 3, if a high frequency vibration (quick swing) occurs in the vehicle width direction, the head interferes with a side support of the headrest 3, and the phase difference φ between the vibrations of the head and the torso of the occupant increases. In this case, there is a correlation between the frequency f of the vibration in the width direction of the vehicle and the phase difference φ between the vibrations of the head and the torso of the occupant, and the phase difference φ between the vibrations of the head and the torso of the occupant increases as the frequency f of the vibration in the vehicle width direction increases. Therefore, the value $\varphi_{th}$ of the phase difference generated when the frequency f of the vibration in the vehicle width direction is the predetermined frequency $f_{th}$ can be set in advance with an experiment or the like.

When the phase difference φ between the vibrations of the head and the torso of the occupant is smaller than the predetermined value $\varphi_{th}$, the headrest shape control unit 72 determines that the frequency f of the vibration in the vehicle width direction is smaller than the predetermined value $f_{th}$, and increases the contact area between the headrest 3 and the head of the occupant. That is, the headrest shape control unit 72 sends a command to the head contact area adjustment mechanism (rest operation adjustment mechanism) B13 to cause the air chamber 31 which is the head contact area adjustment mechanism B13 to expand, thereby increasing a contact area between the headrest 3 and the head of the occupant. Accordingly, movement of the head of the occupant is restricted. On the other hand, when the phase difference y between the vibrations of the head and the torso of the occupant is equal to or larger than the predetermined value $\varphi_{th}$, the headrest shape control unit 72 determines that the frequency f of the vibration in the vehicle width direction is equal to or larger than the predetermined value $f_{th}$, and reduces the contact area between the headrest 3 and the head of the occupant. That is, the headrest shape control unit 72 sends a command to the head contact area adjustment mechanism (rest operation adjustment mechanism) B13 to cause the air chamber 31 which is the head contact area adjustment mechanism B13 to contract from an expanded state, thereby reducing the contact area between the headrest 3 and the head of the occupant. Accordingly, the movement of the head of the occupant is allowed.

In this way, in the present modification, when the phase difference y between the vibrations of the head and the torso of the occupant is equal to or larger than the predetermined value $y_{th}$, the frequency f of the vibration in the vehicle width direction is determined to be equal to or larger than the predetermined value $f_{th}$, the contact area between the headrest 3 and the head of the occupant is reduced, and the movement of the head of the occupant is allowed.

Figure 7:
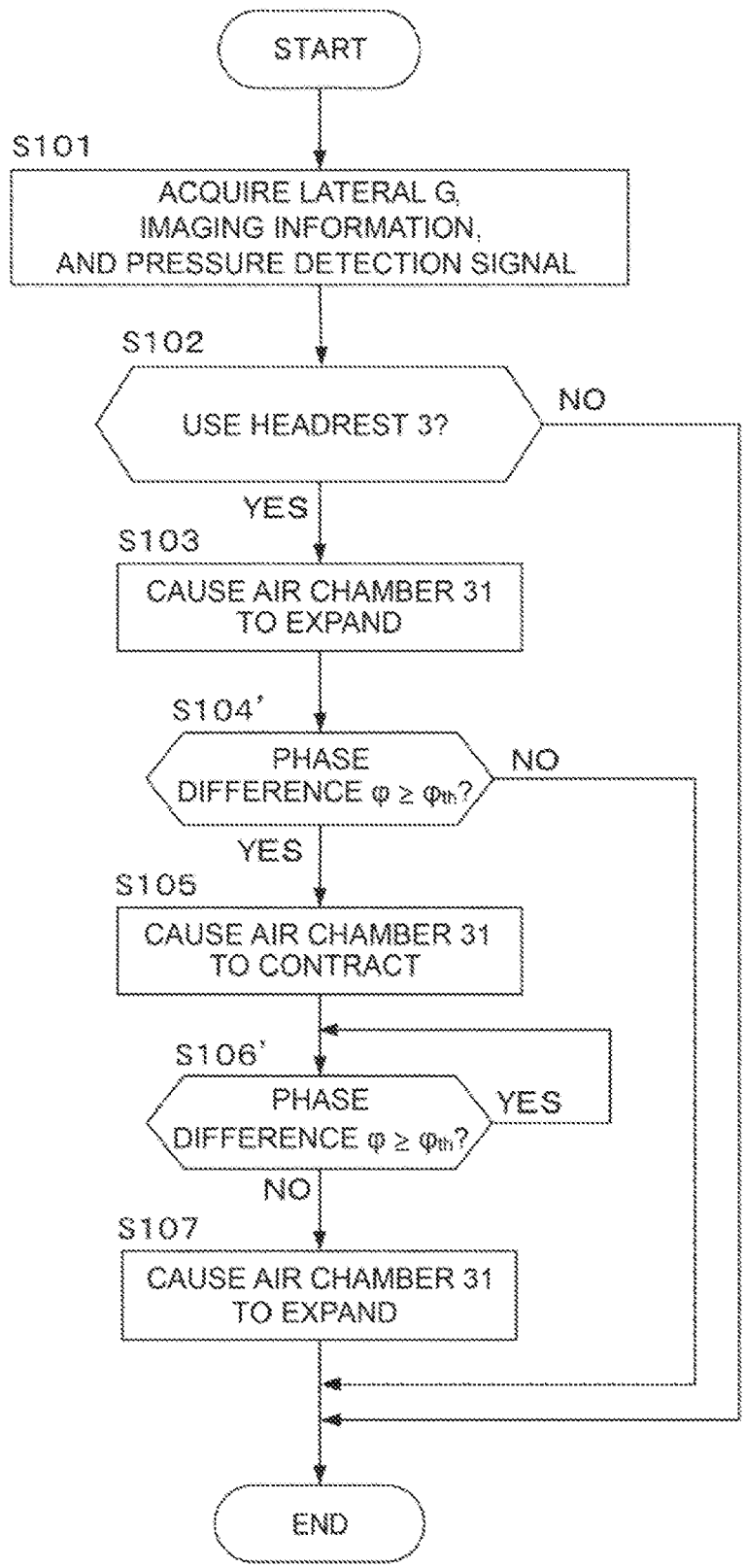
FIG. 7 is a flowchart showing a rest operation control based on a frequency in a width direction of a vehicle executed by the vehicle seat device according to the modification of the first embodiment.

FIG. 7 is a flowchart showing a rest operation control based on a frequency in the width direction of the vehicle executed by the vehicle seat device 100' according to the modification of the first embodiment. As in the first embodiment, all of the following controls are repeatedly executed by the controller 7.

Steps S101 to S103 are the same as those in the first embodiment, and thus the description thereof will be omitted.

In step S104', the controller 7 determines whether the frequency f of the vibration in the vehicle width direction is equal to or larger than the predetermined frequency $f_{th}$ based on the phase difference φ between the vibrations of the head and the torso of the occupant in the width direction of the vehicle. That is, the controller 7 determines, based on the imaging information captured by the monitor camera 6, whether the phase difference φ between the vibrations of the head and the torso of the occupant in the width direction of the vehicle calculated by the phase difference calculation unit 73 is equal to or larger than the predetermined value $\varphi_{th}$. When the phase difference φ is smaller than the predetermined value $\varphi_{th}$, the controller 7 determines that the frequency f of the vibration in the vehicle width direction is smaller than the predetermined frequency $f_{th}$, and ends the rest operation control based on the frequency in the width direction of the vehicle. On the other hand, when the phase difference φ is equal to or larger than the predetermined value $\varphi_{th}$, the controller 7 determines that the frequency f of the vibration in the vehicle width direction is equal to or larger than the predetermined value $f_{th}$, and executes the process of step S105.

As in the first embodiment, in step S105, the headrest shape control unit 72 (controller 7) causes the air chamber 31 to contract toward the rear of the vehicle. Accordingly, the contact area between the headrest 3 and the head of the occupant is reduced, and the movement of the head of the occupant is allowed. In step S105, when the air chamber 31 is already in a contracted state, the headrest shape control unit 72 (controller 7) maintains the state.

In step S106', the headrest shape control unit 72 (controller 7) determines again whether the frequency f of the vibration in the lateral direction (vehicle width direction) of the vehicle is equal to or larger than the predetermined frequency $f_{th}$ based on whether the phase difference φ between the vibrations of the head and the torso of the occupant is equal to or larger than the predetermined value $\varphi_{th}$. A determination procedure is the same as in step S104', and the determination is executed based on the phase difference φ between the vibrations of the head and the torso of the occupant in the width direction of the vehicle. When it is determined that the phase difference φ is equal to or larger than the predetermined value $\varphi_{th}$ and the frequency f of the vibration in the vehicle width direction is equal to or larger than the predetermined value $f_{th}$, the controller 7 repeats the process of step S106 while maintaining the contracted state of the air chamber 31 until the phase difference y is smaller than the predetermined value $\varphi_{th}$. On the other hand, when the phase difference φ is smaller than the predetermined value $\varphi_{th}$ (when the frequency f is smaller than the predetermined frequency $f_{th}$), the controller 7 executes the process of step S107.

In step S107, the headrest shape control unit 72 (controller 7) causes the air chamber 31 to expand to increase the contact area between the headrest 3 and the head of the occupant. When the process of step S107 is executed, the controller 7 ends the rest operation control based on the frequency in the width direction of the vehicle.

According to the vehicle seat device 100' in the modification of the first embodiment described above, the following effects can be obtained.

According to the vehicle seat device 100', when the phase difference φ between the vibration of the head of the occupant in the width direction of the vehicle and the vibration of the torso of the occupant in the width direction of the vehicle is equal to or larger than the predetermined value $\varphi_{th}$, the headrest shape control unit 72 (controller 7) determines that the frequency f of the vibration in the width direction of the vehicle is equal to or larger than the predetermined value $\varphi_{th}$, and allows the movement of the head of the occupant. In this way, the controller 7 determines whether to allow the movement of the head of the occupant based on the phase difference φ between the vibrations of the head and the torso of the occupant which causes discomfort to the occupant, and thus it is possible to more reliably prevent the discomfort of the occupant.

(Second Embodiment)

A vehicle seat device 200 according to a modification of a second embodiment will be described with reference to FIGS. 8 to 10. The present embodiment is different from the other embodiments in that a displacement adjustment mechanism B23 that restricts or allows displacement of the headrest 3 with respect to the seatback 2 is included. The same elements as those in the other embodiments are denoted by the same reference numerals, and the description thereof will be omitted.

Figure 8:
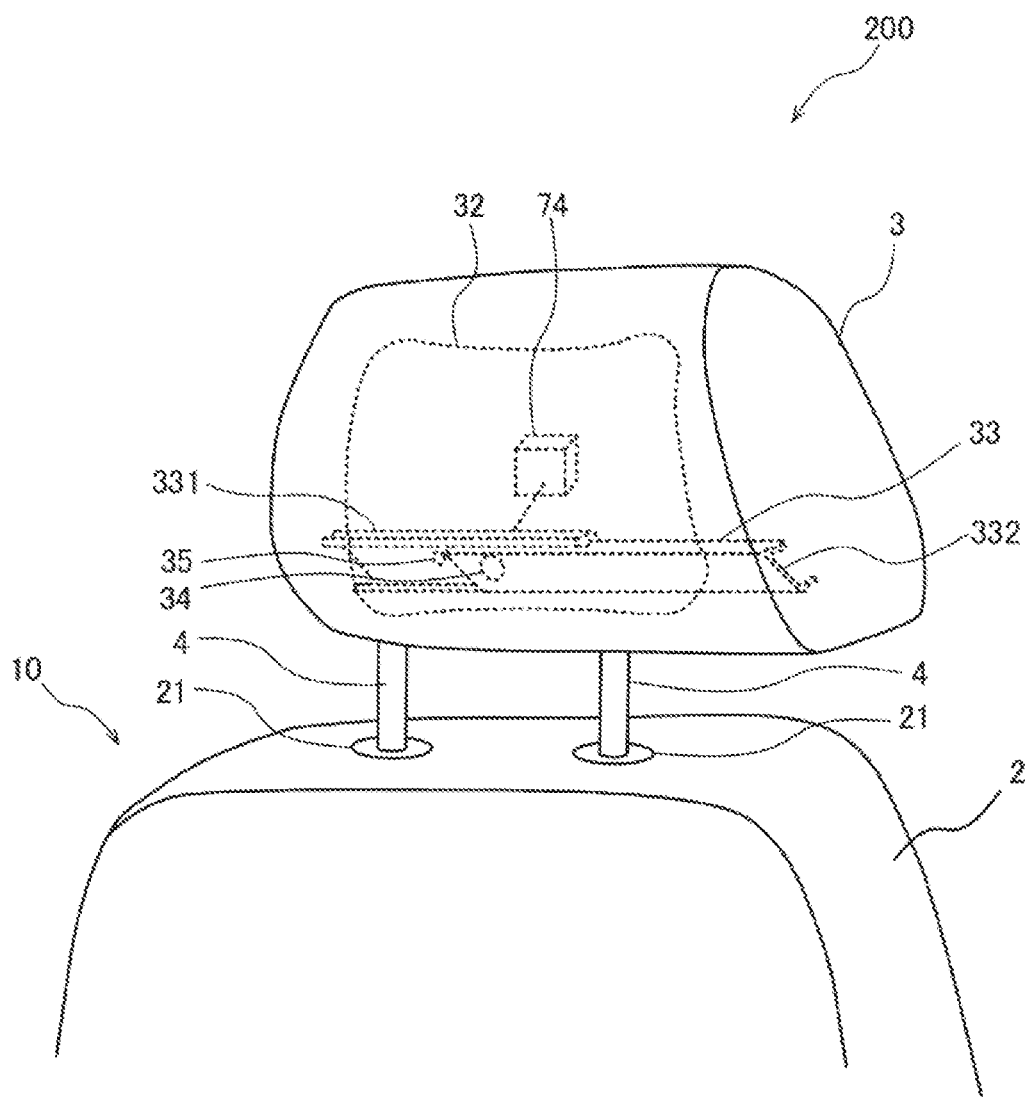
FIG. 8 is a schematic diagram showing a headrest of a vehicle seat device according to a second embodiment.

FIG. 8 is a schematic diagram showing the headrest 3 of the vehicle seat device 200 according to the second embodiment.

As shown in FIG. 8, the headrest 3 in the present embodiment includes a slide mechanism (rest operation adjustment mechanism, displacement adjustment mechanism) 33, a lock mechanism (rest operation adjustment mechanism, displacement adjustment mechanism) 34, a position sensor 35, and a headrest position control unit 74. Although not shown, both left and right ends (in a vehicle width direction) of the headrest 3 protrude toward the front of a vehicle, and form side supports that support a head of an occupant seated on the vehicle seat 10 (seat cushion 1) from temporal regions of the occupant. The headrest 3 has the side supports, and thus movement of the head of the occupant is restricted, and even when a slow lateral swing (low frequency vibration) such as cornering or lane change occurs, phases of vibrations of the head and a torso of the occupant are synchronized with each other, and a magnitude of movement of a viewpoint of the occupant is reduced. Therefore, discomfort of the occupant is reduced, and car sickness or the like is prevented.

The slide mechanism 33 is provided inside the headrest 3, and includes a rail 331, and a guide 332 that is fitted to the rail 331 and is slidably displaceable on the rail 331 to the left and right (in the vehicle width direction). The rail 331 is connected and fixed to the headrest stay 4 inside the headrest 3. The guide 332 is fixed to the headrest 3 inside the headrest 3, and the headrest 3 is relatively displaced in the vehicle width direction with respect to the seatback 2 by the guide 332 being relatively displaced on the rail 331 to the left and right (in the vehicle width direction) with respect to the rail 331. In this way, the slide mechanism 33 causes the headrest 3 to slidably displace in a width direction of the vehicle with respect to the seatback 2.

The lock mechanism 34 includes a fitting pin (not shown) that engages with a hole (not shown) provided in the rail 331 and the guide 332 of the slide mechanism 33, and a motor (not shown) that drives the fitting pin to advance and retract in a direction of the slide mechanism 33. In a state in which the fitting pin of the lock mechanism 34 is engaged with the slide mechanism 33 (locked state), a position of the headrest 3 is fixed with respect to the seatback 2, and in a state in which the engagement is released (released state), the headrest 3 is allowed to be displaced with respect to the seatback 2. The locked state and the released state of the lock mechanism 34 are switched by advancing and retracting the fitting pin by using the motor to engage the fitting pin with the slide mechanism 33 or release the engagement. An operation of the lock mechanism 34 is controlled by the headrest position control unit 74 to be described later.

In this way, the slide mechanism 33 and the lock mechanism 34 restrict the displacement of the headrest 3 with respect to the seatback 2 in the locked state of the lock mechanism 34, and allow the displacement of the headrest 3 with respect to the seatback 2 in the released state of the lock mechanism 34. In a state in which the displacement of the headrest 3 is restricted, the movement of the head of the occupant seated on the vehicle seat 10 is restricted, and in a state in which the displacement of the headrest 3 is allowed, the movement of the head of the occupant seated on the vehicle seat 10 is allowed. That is, the slide mechanism 33 and the lock mechanism 34 constitute a displacement adjustment mechanism that restricts or allows the displacement of the headrest 3, and constitute a rest operation adjustment mechanism that restricts or allows the movement of the head of the occupant by restricting or allowing the displacement of the headrest 3. In the released state of the lock mechanism 34, when a vibration occurs in the width direction of the vehicle, the headrest 3 is displaced in the vehicle width direction with respect to the seatback 2, and the movement of the head of the occupant is allowed.

The slide mechanism 33 includes a drive mechanism (not shown) connected to the guide 332. The drive mechanism includes a motor or the like, and in the released state of the lock mechanism 34, the headrest 3 can be slidably displaced in a forced manner in the width direction of the vehicle with a drive force of the motor. The slide mechanism 33 (the motor thereof) is controlled by the headrest position control unit 74 to be described later.

The position sensor 35 is installed on the rail 331 of the slide mechanism 33, and detects a relative position of the guide 332 with respect to the rail 331. The position sensor 35 detects the position of the guide 332 to detect a relative position of the headrest 3 to which the guide 332 is fixed with respect to the seatback 2. Detected position information of the headrest 3 is transmitted to the controller 7. An installation position of the position sensor 35 is not limited to a position on the rail 331, and the position sensor 35 may be installed at any position as long as the position sensor 35 can detect the position of the headrest 3.

The headrest position control unit 74 is included in the controller 7, and controls the slide mechanism 33 and the lock mechanism 34 to control the position of the headrest 3. The headrest position control unit 74 restricts or allows the displacement of the headrest 3 with respect to the seatback 2 by switching the lock mechanism 34 between the locked state and the released state. Accordingly, the movement of the head of the occupant seated on the vehicle seat 10 is restricted or allowed. The headrest position control unit 74 controls the position of the headrest 3 by controlling the slide mechanism 33 to cause the headrest 3 to slidably displace in the width direction of the vehicle.

As described above, when the occupant uses the headrest 3, if a high frequency vibration (quick swing) occurs in the vehicle width direction, the head may interfere with the side support of the headrest 3, and the quick swing of the head may be aggravated. The aggravation of the quick swing of the head may cause the viewpoint of the occupant to become unsteady, cause the discomfort to the occupant, and cause the car sickness or the like.

Therefore, in the present embodiment, when the frequency f of a vibration in the width direction of the vehicle is equal to or larger than the predetermined value $f_{th}$, the displacement of the headrest 3 with respect to the seatback 2 is allowed so as to allow the movement of the head of the occupant. Accordingly, when a small lateral swing (high frequency vibration) occurs, an action of spinal reflex of the occupant, which attempts to synchronize movements of the torso and the head, can be activated to some extent, and the phases of the vibrations of the head and the torso of the occupant can be synchronized with each other. Therefore, even when the small lateral swing (high frequency vibration) occurs, the magnitude of the movement of the viewpoint of the occupant is reduced, and the discomfort of the occupant is prevented.

Figure 9:
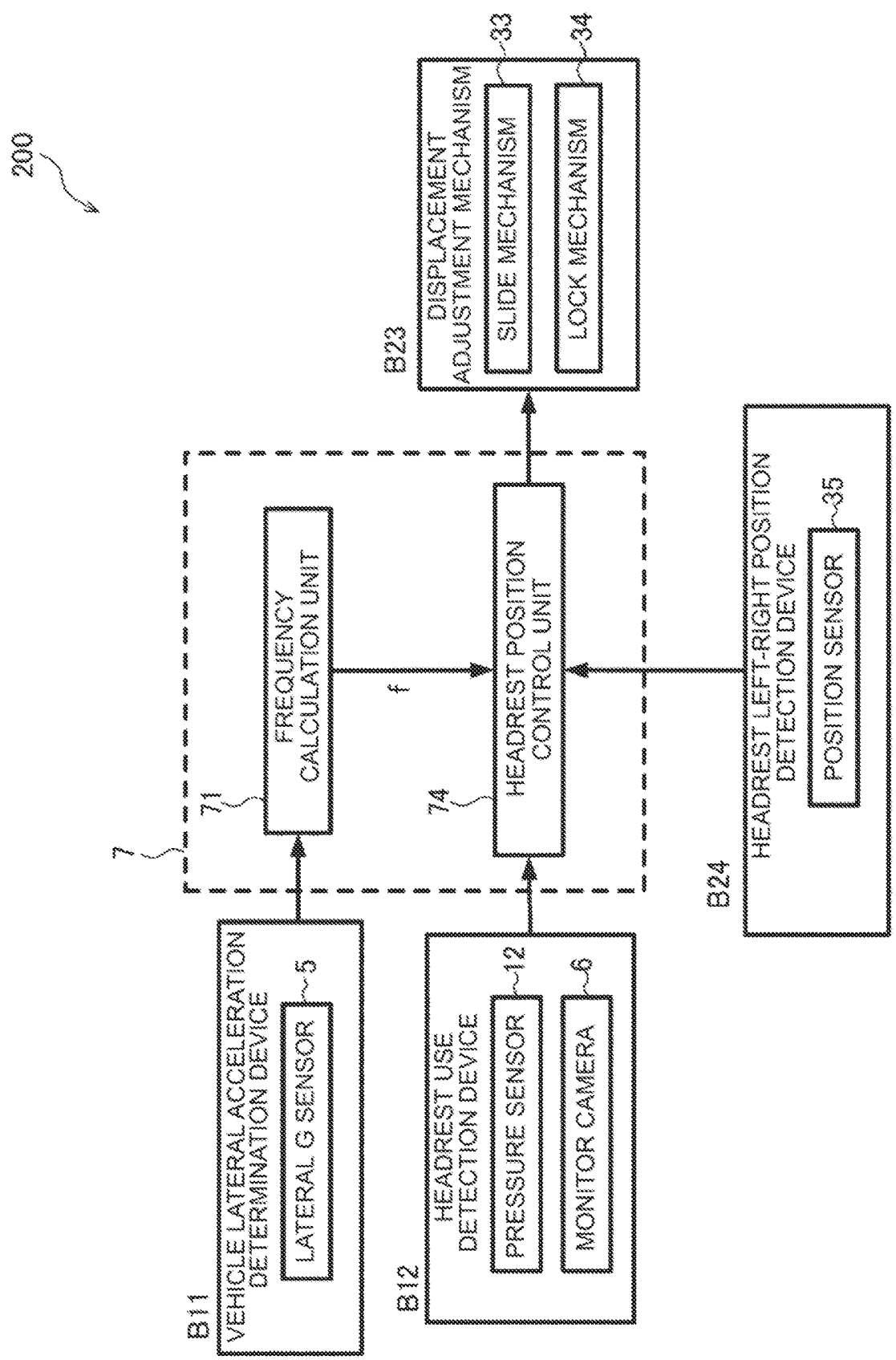
FIG. 9 is a block diagram showing a functional configuration of the vehicle seat device according to the second embodiment.

FIG. 9 is a block diagram showing a functional configuration of the vehicle seat device 200 according to the second embodiment.

As shown in FIG. 9, the controller 7 includes the frequency calculation unit 71 and the headrest position control unit 74.

As in the first embodiment, the frequency calculation unit 71 calculates the frequency f of the vibration in the vehicle width direction based on lateral acceleration (lateral G) information received from the vehicle lateral acceleration measurement device B11 (lateral G sensor 5). The calculated frequency f of the vibration in the vehicle width direction is input to the headrest position control unit 74.

Headrest use determination information detected by the headrest use detection device B12 (pressure sensor 32, monitor camera 6, or the like) and the frequency f of the vibration in the vehicle width direction of the vehicle calculated by the frequency calculation unit 71 are input to the headrest position control unit 74.

Position information of the headrest 3 in a left-right (vehicle width) direction is transmitted to the headrest position control unit 74 from a headrest left-right position detection device B24 that detects a position of the headrest 3 in the left-right (vehicle width) direction. In the present embodiment, the headrest left-right position detection device B24 is the position sensor 35, and the position information of the headrest 3 detected by the position sensor 35 is transmitted to the headrest position control unit 74. The headrest left-right position detection device B24 is not limited to the position sensor 35, and any known device may be used as long as the device can detect the relative position of the headrest 3 with respect to the seatback 2.

The headrest position control unit 74 determines, based on the headrest use determination information, whether the use of the headrest 3 by the occupant is recognized. When the use of the headrest 3 is recognized, the headrest position control unit 74 determines whether the input frequency f of the vibration in the vehicle width direction of the vehicle is equal to or larger than the predetermined frequency $f_{th}$, and controls the displacement adjustment mechanism (rest operation adjustment mechanism) B23 based on the determination result. As in the first embodiment, the predetermined frequency $f_{th}$ is a frequency at which, when the movement of the head of the occupant is restricted, the swing of the head is aggravated by the side support of the headrest 3, and a phase difference occurs between the vibrations of the head and the torso of the occupant to cause the discomfort to the occupant, and can be set in advance with an experiment or the like.

When the frequency f of the vibration in the vehicle width direction is smaller than the predetermined frequency $f_{th}$, the headrest position control unit 74 sends a command to the displacement adjustment mechanism (rest operation adjustment mechanism) B23 to restrict the displacement of the headrest 3 with respect to the seatback 2. Specifically, the headrest position control unit 74 controls the slide mechanism 33 and the lock mechanism 34, which constitute the displacement adjustment mechanism (rest operation adjustment mechanism) B23, so as to set the lock mechanism 34 to the locked state in a state in which the guide 332 of the slide mechanism 33 is located at a center position of the rail 331 in the left-right (vehicle width) direction. Accordingly, the displacement of the headrest 3 with respect to the seatback 2 is restricted, and the movement of the head of the occupant is restricted. On the other hand, when the input frequency f of the vibration in the vehicle width direction of the vehicle is equal to or larger than the predetermined frequency $f_{th}$, the headrest position control unit 74 sends a command to the displacement adjustment mechanism (rest operation adjustment mechanism) B23 to allow the displacement of the headrest 3 with respect to the seatback 2. Specifically, the headrest position control unit 74 controls the slide mechanism 33 and the lock mechanism 34, which constitute the displacement adjustment mechanism (rest operation adjustment mechanism) B23, so as to set the lock mechanism 34 to the released state. Accordingly, the displacement of the headrest 3 with respect to the seatback 2 is allowed, and the movement of the head of the occupant is allowed. As the movement of the head is allowed, the phases of the vibrations of the head and the torso of the occupant are synchronized with each other by the action of spinal reflex of the occupant.

In this way, in the present embodiment, when the frequency f of the vibration in the width direction of the vehicle is equal to or larger than the predetermined value $f_{th}$, the displacement of the headrest 3 with respect to the seatback 2 is allowed, so that the movement of the head of the occupant is allowed, and the phases of the vibrations of the head and the torso of the occupant are synchronized with each other. Accordingly, even when the high frequency vibration occurs in the vehicle width direction, the magnitude of the movement of the viewpoint of the occupant is reduced, and the discomfort of the occupant is prevented.

Figure 10:
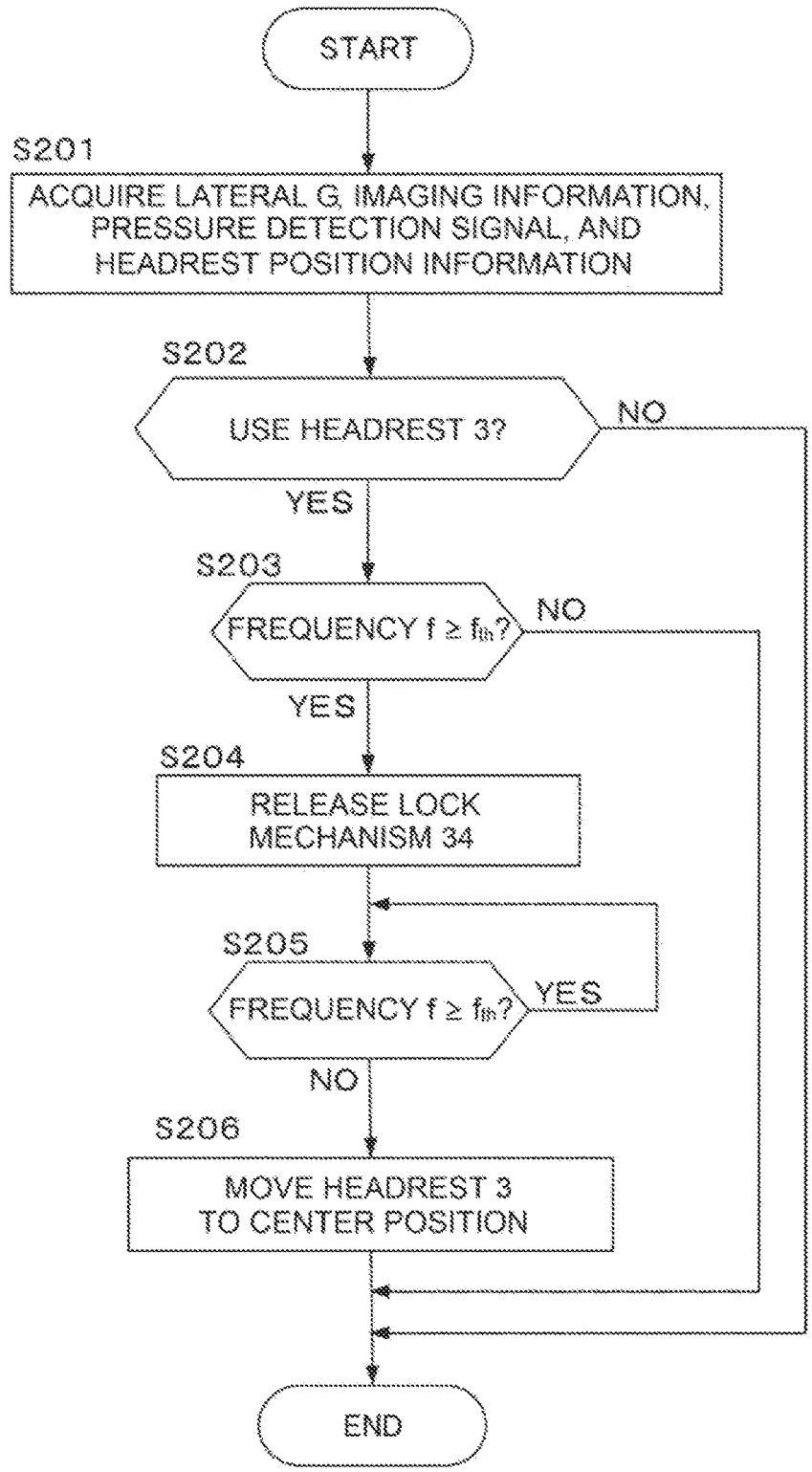
FIG. 10 is a flowchart showing a rest operation control based on a frequency in a width direction of a vehicle executed by the vehicle seat device according to the second embodiment.

FIG. 10 is a flowchart showing a rest operation control based on a frequency in the width direction of the vehicle executed by the vehicle seat device 200 according to the present embodiment. As in the first embodiment, all of the following controls are repeatedly executed by the controller 7.

In an initial state, the guide 332 of the slide mechanism 33 is locked by the lock mechanism 34 at the center position of the rail 331 in the left-right (vehicle width) direction. That is, the headrest 3 is locked at a center position of the seatback 2 in the left-right (vehicle width) direction.

When an activation command is received, in step S201, the controller 7 receives the lateral acceleration (lateral G) information of the vehicle from the lateral G sensor 5 and the imaging information from the monitor camera 6, and receives a detection signal when the pressure sensor 32 detects a predetermined pressure or more. The controller 7 receives the position information of the headrest 3 detected by the position sensor 35.

In step S202, the controller 7 determines whether the occupant is using the headrest 3. As in the first embodiment, whether the headrest 3 is used is determined based on whether the controller 7 receives the detection signal from the pressure sensor 32, whether the use of the headrest 3 by the occupant is recognized based on the imaging information of the monitor camera 6, or the like. When the use of the headrest 3 by the occupant is not recognized, the controller 7 ends the rest operation control based on the frequency in the width direction of the vehicle. On the other hand, when the use of the headrest 3 by the occupant is recognized, the controller 7 executes a process of step S203.

In step S203, the headrest position control unit 74 (controller 7) determines whether the frequency f of the vibration in the lateral direction (vehicle width direction) of the vehicle is equal to or larger than the predetermined frequency $f_{th}$. As described above, the frequency f of the vibration in the vehicle width direction is calculated by the frequency calculation unit 71 of the controller 7 based on the lateral acceleration (lateral G) information. When the frequency f of the vibration in the vehicle width direction is smaller than the predetermined frequency $f_{th}$, the controller 7 ends the rest operation control based on the frequency in the width direction of the vehicle. On the other hand, when the frequency f of the vibration in the vehicle width direction is equal to or larger than the predetermined frequency $f_{th}$, the controller 7 executes a process of step S204.

In step S204, the headrest position control unit 74 (controller 7) sets the lock mechanism 34 to the released state. Accordingly, the displacement of the headrest 3 with respect to the seatback 2 is allowed, and the movement of the head of the occupant is allowed. As the movement of the head is allowed, the phases of the vibrations of the head and the torso of the occupant are synchronized with each other by the action of spinal reflex of the occupant. When the lock mechanism 34 is set to the released state, the controller 7 executes a process of step S205.

In step S205, the headrest position control unit 74 (controller 7) determines again whether the frequency f of the vibration in the lateral direction (vehicle width direction) of the vehicle is equal to or larger than the predetermined frequency $f_{th}$. A determination procedure is the same as in step S203. When the frequency f of the vibration in the vehicle width direction is equal to or larger than the predetermined frequency $f_{th}$, the headrest position control unit 74 (controller 7) repeats the process of step S205 while maintaining the released state of the lock mechanism 34 until the frequency f of the vibration in the vehicle width direction is smaller than the predetermined frequency $f_{th}$. On the other hand, when the frequency f of the vibration in the vehicle width direction is smaller than the predetermined frequency $f_{th}$, the controller 7 executes a process of step S206.

In step S206, the headrest position control unit 74 (controller 7) controls the slide mechanism 33 (the motor thereof) to move the guide 332 of the slide mechanism 33 to the center position of the rail 331 in the left-right (vehicle width) direction. That is, the headrest shape control unit 72 (controller 7) controls the slide mechanism 33 such that the headrest 3 is located at the center position of the seatback 2 in the left-right (vehicle width) direction. When the guide 332 of the slide mechanism 33 is already located at the center position of the rail 331 in the left-right (vehicle width) direction, the headrest position control unit 74 (controller 7) maintains the position. When the guide 332 is moved to the center position of the rail 331 in the left-right direction, the headrest shape control unit 72 (controller 7) sets the lock mechanism 34 to the locked state and ends the rest operation control based on the frequency in the width direction of the vehicle.

Also in the present embodiment, as in the modification of the first embodiment, the phase difference φ between the vibrations of the head and the torso of the occupant in the width direction of the vehicle may be calculated based on the imaging information of the monitor camera 6, and the movement of the head of the occupant may be allowed when the phase difference φ is equal to or larger than the predetermined value $\varphi_{th}$.

According to the vehicle seat device 200 in the second embodiment described above, the following effects can be obtained.

The vehicle seat device 200 includes the rest operation adjustment mechanism (slide mechanism 33 and lock mechanism 34) provided in the headrest 3 and configured to restrict or allow the movement of the head of the occupant seated on the vehicle seat 10, and the headrest position control unit 74 (controller 7). The headrest position control unit 74 (controller 7) controls the rest operation adjustment mechanism (slide mechanism 33 and lock mechanism 34) to allow the movement of the head of the occupant when the frequency f of the vibration in the width direction of the vehicle is equal to or larger than the predetermined value $f_{th}$. In this way, when the frequency f of the vibration in the width direction of the vehicle is equal to or larger than the predetermined value $f_{th}$, the movement of the head of the occupant is allowed. Therefore, even when the small lateral swing (high frequency vibration) occurs in the vehicle, the phases of the vibrations of the head and the torso of the occupant can be synchronized with each other by activating the action of spinal reflex of the occupant. Therefore, the magnitude of the movement of the viewpoint of the occupant is reduced, and the discomfort of the occupant is prevented.

According to the vehicle seat device 200, the headrest position control unit 74 (controller 7) controls the rest operation adjustment mechanism (slide mechanism 33 and lock mechanism 34) to allow the displacement of the headrest 3 with respect to the seatback 2 when the frequency f of the vibration in the width direction of the vehicle is equal to or larger than the predetermined value $f_{th}$. Accordingly, the movement of the head of the occupant is allowed. Therefore, even when the small lateral swing (high frequency vibration) occurs in the vehicle, the phases of the vibrations of the head and the torso of the occupant can be synchronized with each other, and the magnitude of the movement of the viewpoint of the occupant is reduced, so that the discomfort of the occupant is prevented.

The vehicle seat device 200 includes the slide mechanism 33 that causes the headrest 3 to slidably displace in the width direction of the vehicle with respect to the seatback 2, and the lock mechanism 34 that restricts the slide displacement of the headrest 3. When the frequency f of the vibration in the width direction of the vehicle is equal to or larger than the predetermined value $f_{th}$, the headrest position control unit 74 (controller 7) releases the lock mechanism 34 and allows the displacement of the headrest 3 to allow the movement of the head of the occupant. Therefore, even when the small lateral swing (high frequency vibration) occurs in the vehicle, the phases of the vibrations of the head and the torso of the occupant can be synchronized with each other, and the magnitude of the movement of the viewpoint of the occupant is reduced, so that the discomfort of the occupant is prevented.

In the present embodiment, the slide mechanism 33 and the lock mechanism 34 that slide the headrest 3 in the lateral (vehicle width) direction are used as the rest operation adjustment mechanism that restricts or allows the displacement of the headrest 3 with respect to the seatback 2, but the present invention is not necessarily limited thereto. That is, any known mechanism may be used as long as the mechanism can restrict and allow the displacement of the headrest 3. For example, a motor or the like that drives the headrest 3 may be built in the headrest 3 or provided outside the headrest 3, and the headrest 3 may be moved to the left and right (in the vehicle width direction) by the motor or the like when the frequency f of the vibration in the vehicle width direction is equal to or larger than the predetermined value fth.

Figure 11A:
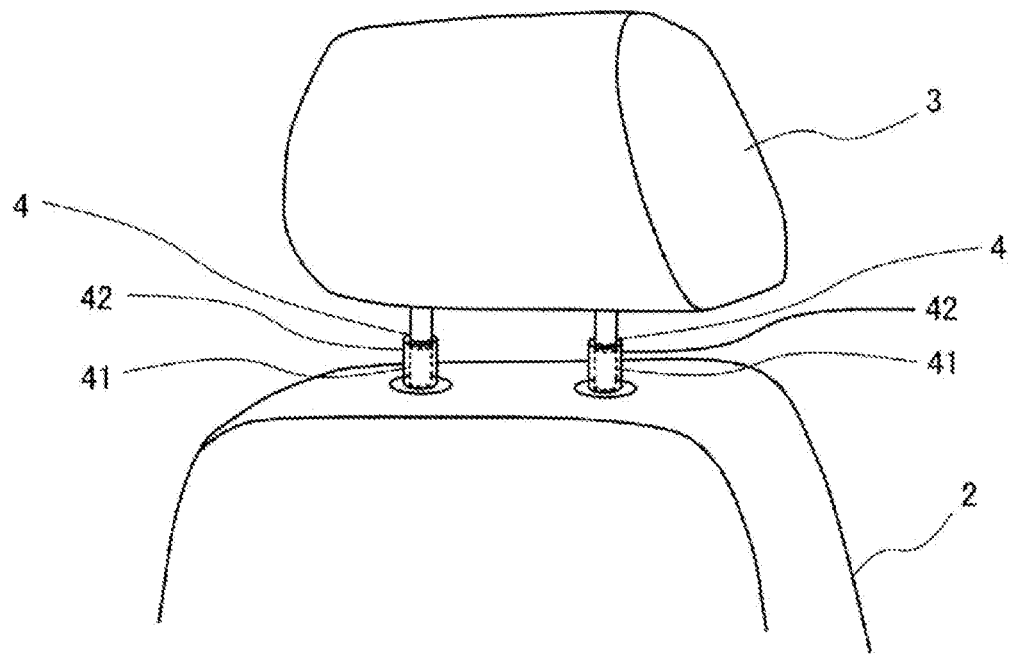
FIGS. 11A and 11B are a schematic diagram showing a headrest and a headrest stay according to a modification.
Figure 11B:
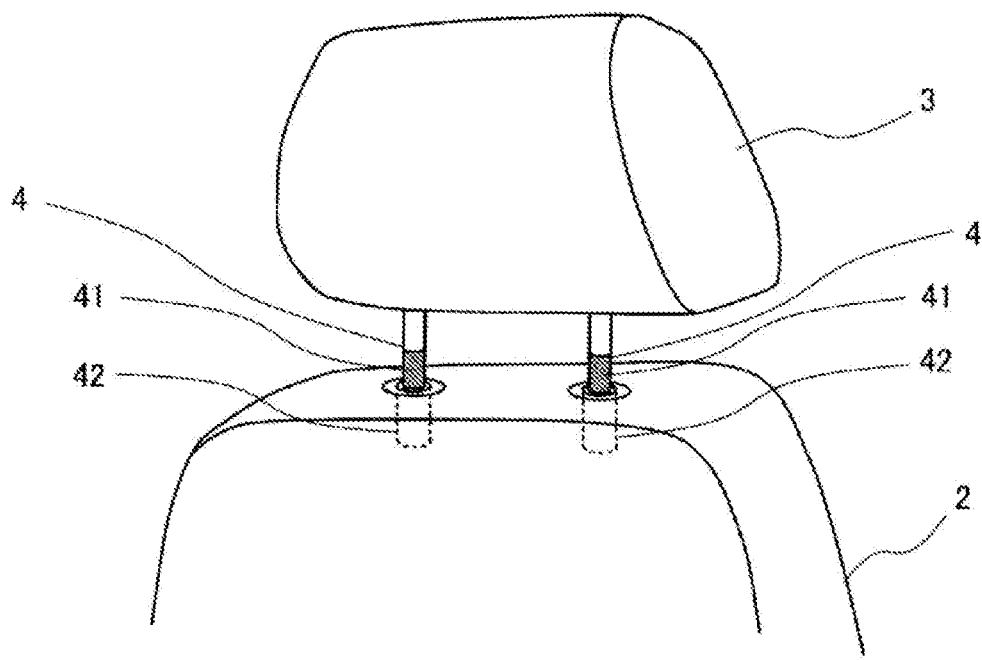

For example, as shown in FIGS. 11A and 11B, the headrest stay 4 may be used that includes a stay upper portion made of a metal rigid body, a stay lower portion formed of an elastic portion 41 made of an elastic body, and a housing 42 which is a rigid body for accommodating and supporting the elastic portion 41. In this case, when the frequency f of the vibration is smaller than the predetermined value $f_{th}$, as shown in FIG. 11A, the elastic portion 41 is accommodated and supported in the housing 42 which is a rigid body. On the other hand, when the frequency f of the vibration in the vehicle width direction is equal to or larger than the predetermined value $f_{th}$, as shown in FIG. 11B, the housing 42 is accommodated inside the seatback 2 by a power mechanism (not shown) connected to the housing 42. Accordingly, when the frequency f of the vibration in the vehicle width direction is equal to or larger than the predetermined value $f_{th}$, the elastic portion 41 of the headrest stay 4 is bent, so that the movement of the head of the occupant seated on the vehicle seat 10 is allowed.

When the slide mechanism 33 and the lock mechanism 34 are used, the slide mechanism 33 and the lock mechanism 34 are also not limited to the configuration in the present embodiment, and any known mechanism may be used.

Whether the frequency f of the vibration in the vehicle width direction is equal to or larger than the predetermined value $f_{th}$ is determined based on the detection result of the lateral G sensor 5 in the first and second embodiments, and is determined based on the phase difference φ between the vibrations of the head and the torso of the occupant according to the imaging information of the monitor camera 6 in the modification of the first embodiment, but the present invention is not necessarily limited thereto. For example, whether the frequency f of the vibration in the vehicle width direction is equal to or larger than the predetermined value $f_{th}$ may be determined based on information of a navigation system or vehicle to everything (V2X) and the like.

A curve may be detected based on a navigation system or the like, and the frequency f of the vibration in the vehicle width direction may be considered to be equal to or larger than the predetermined value $f_{th}$ in a case of outside the curve, and the movement of the head of the occupant may be restricted (the air chamber 31 may be expanded, the lock mechanism 34 may be set to the locked state, or the like).

Although the embodiments of the present invention are described above, the above embodiments are merely a part of application examples of the present invention, and do not mean that the technical scope of the present invention is limited to the specific configurations of the above embodiments.

Each of the embodiments described above is described as a single embodiment, but may be appropriately combined. For example, when the frequency f of the vibration in the vehicle width direction is equal to or larger than the predetermined value $f_{th}$, the air chamber 31 built in the headrest 3 may be contracted, and the lock mechanism 34 in the headrest 3 may be set to the released state.

The invention claimed is:

1. A vehicle seat device, comprising:
   a headrest configured to support a head of an occupant seated on a vehicle seat;
   a rest operation adjustment mechanism provided on the headrest and configured to restrict or allow movement of the head of the occupant seated on the vehicle seat; and
   a controller that controls the rest operation adjustment mechanism to allow movement of the head of the occupant in a width direction of a vehicle when a frequency of a vibration in the width direction of the vehicle is equal to or larger than a predetermined value.

2. The vehicle seat device according to claim 1, wherein the controller determines that the frequency of the vibration in the width direction of the vehicle is equal to or larger than the predetermined value and allows the movement of the head of the occupant when a phase difference between a vibration of the head of the occupant in the width direction of the vehicle and a vibration of a torso of the occupant in the width direction of the vehicle is equal to or larger than a predetermined value.

3. The vehicle seat device according to claim 1, wherein the rest operation adjustment mechanism includes a head contact area adjustment mechanism configured to adjust a contact area between the headrest and the head of the occupant, and
   when the frequency of the vibration in the width direction of the vehicle is equal to or larger than the predetermined value, the controller controls the head contact area adjustment mechanism to reduce a contact area between the headrest and the head of the occupant compared to a case where the frequency is smaller than the predetermined value.

4. The vehicle seat device according to claim 3, wherein the head contact area adjustment mechanism is an air chamber that is built in the headrest and is expandable and contractible in a front-rear direction of the vehicle at a position where a temporal region of the occupant seated on the vehicle seat comes.

5. The vehicle seat device according to claim 3, wherein the head contact area adjustment mechanism is an actuator that is built in the headrest and is expandable and contractible in a front-rear direction of the vehicle at a position where a temporal region of the occupant seated on the vehicle seat comes.

6. The vehicle seat device according to claim 1, further comprising:
   a seatback configured to support a back of the occupant seated on the vehicle seat, wherein
   the rest operation adjustment mechanism includes a displacement adjustment mechanism configured to be displaced in the width direction of the vehicle with respect to the seatback and configured to restrict or allow displacement of the headrest with respect to the seatback, and
   the controller controls the displacement adjustment mechanism to allow the displacement of the headrest with respect to the seatback so as to allow movement of the head of the occupant when the frequency of the vibration in the width direction of the vehicle is equal to or larger than the predetermined value, and to restrict the displacement of the headrest with respect to the seatback when the frequency of the vibration in the width direction of the vehicle is smaller than the predetermined value.

7. The vehicle seat device according to any one of claim 1, further comprising:
   a seatback configured to support a back of the occupant seated on the vehicle seat, wherein
   the rest operation adjustment mechanism includes a displacement adjustment mechanism configured to be displaced in the width direction of the vehicle with respect to the seatback and configured to restrict or allow displacement of the headrest with respect to the seatback,
   the displacement adjustment mechanism includes a slide mechanism configured to cause the headrest to slidably displace with respect to the seatback in the width direction of the vehicle, and a lock mechanism configured to restrict slide displacement of the headrest, and
   when the frequency of the vibration in the width direction of the vehicle is equal to or larger than the predetermined value, the controller releases the lock mechanism and allows the displacement of the headrest to allow the movement of the head of the occupant.

8. A control method for a vehicle seat device, the vehicle seat device including a headrest configured to support a head of an occupant seated on a vehicle seat, and a rest operation adjustment mechanism provided on the headrest and configured to restrict or allow movement of the head of the occupant seated on the vehicle seat, the control method comprising:

allowing, by the rest operation adjustment mechanism, movement of the head of the occupant in a width direction of a vehicle when a frequency of a vibration in the width direction of the vehicle is equal to or larger than a predetermined value.

9. The control method for a vehicle seat device according to claim 8, further comprising:

determining that the frequency of the vibration in the width direction of the vehicle is equal to or larger than the predetermined value and allowing the movement of the head of the occupant by the rest operation adjustment mechanism when a phase difference between a vibration of the head of the occupant in the width direction of the vehicle and a vibration of a torso of the occupant in the width direction of the vehicle is equal to or larger than a predetermined value.

10. The control method for a vehicle seat device according to claim 8, wherein the rest operation adjustment mechanism includes a head contact area adjustment mechanism configured to adjust a contact area between the headrest and the head of the occupant, and when the frequency of the vibration in the width direction of the vehicle is equal to or larger than the predetermined value, the head contact area adjustment mechanism reduces a contact area between the headrest and the head of the occupant compared to a case where the frequency is smaller than the predetermined value.

11. The control method for a vehicle seat device according to claim 8, wherein the vehicle seat device further includes a seatback configured to support a back of the occupant seated on the vehicle seat, and the rest operation adjustment mechanism includes a displacement adjustment mechanism configured to be displaced in the width direction of the vehicle with respect to the seatback and configured to restrict or allow displacement of the headrest with respect to the seatback, and the displacement adjustment mechanism allows the displacement of the headrest with respect to the seatback so as to allow movement of the head of the occupant when the frequency of the vibration in the width direction of the vehicle is equal to or larger than the predetermined value, and the displacement adjustment mechanism restricts the displacement of the headrest with respect to the seatback when the frequency of the vibration in the width direction of the vehicle is smaller than the predetermined value.

\* \* \* \* \*